Patented Apr. 6, 1926.

1,579,898

UNITED STATES PATENT OFFICE.

CHARLES E. TEBBS, OF NEW YORK, N. Y., AND JOHN HELFRICH, OF WESTFIELD, NEW JERSEY, ASSIGNORS TO STAR COMPANY, OF NEW YORK, N. Y., A CORPORATION OF NEW YORK.

PHOTOGRAPHICALLY-SENSITIVE RESIST COMPOUND.

No Drawing. Application filed February 11, 1925. Serial No. 8,533.

*To all whom it may concern:*

Be it known that CHARLES E. TEBBS and JOHN HELFRICH, citizens of the United States, residing in the city, county, and State of New York, and in the city of Westfield, in the county of Union and State of New Jersey, have invented certain new and useful Improvements in Photographically-Sensitive Resist Compounds, of which the following is a specification.

This improvement relates to a novel photographic compound and more particularly to a photographic compound used in the preparation of a suitable sensitizing film for zinc printing plates.

A great obstacle to the development of a suitable process for preparing printing plates of zinc electrolytically, has hitherto been the difficulty in producing a photographic film for coating such plates which will be sufficiently fast in operation, which can be properly developed and which will sufficiently resist the action of electrolytic agents in an etching bath, also nitric acid etching in a rocket, spray, or splashing etching machine.

Such a compound we have produced and it is made according to the following formula:

A concentrated solution of the resin, known as dragon's blood is made by dissolving one pound of dragon's blood in 64 fluid ounces of wood alcohol (methanol, $CH_3OH$) and 5 fluid ounces of ether, $(C_2H_5)_2O$. The mixture is shaken and allowed to set for 24 hours.

Then we take 7 ounces of bleached shellac and 12 ounces of orange superfine shellac. To the 19 ounces of shellac, we add 16 fluid ounces of the solution of dragon's blood, 55 fluid ounces of aqua ammonia 28° and 44 fluid ounces of water. This mixture is stirred well, boiled for 20 minutes and then allowed to cool.

The next step is the preparation of the sensitizing solution. This is made by dissolving 2⅝ ounces of ammonium bichromate in 16 ounces of water and then adding 20 fluid ounces of aqua ammonia to the dissolved ammonium bichromate. The solution of ammonium bichromate thus prepared, is added to the foregoing solution of shellac and dragon's blood and then sufficient water is added to bring the volume of the entire liquid to 280 fluid ounces. This solution is prepared and filtered in the dark.

Of this sensitizing solution a thin film is flown evenly over the clean surface of the plate and the plate is then whirled in order to obtain a uniform coating. The solution is applied cold, but heat may be used to hasten the evaporation of the solvents used in the sensitizing mixture.

When the film has been dried, the zinc plate is then ready for exposure and is placed in the printing frame in contact with the negative containing the subject matter to be reproduced on the plate and the plate is then exposed to the light.

The enamel-like film which is produced by the foregoing process has the great advantage of being sufficiently adherent to the plate and resistant to the action of the electrolytic bath which is used in the etching of the zinc plate coated with the film herein described.

In repeated tests made in etching zinc plates electrolytically, we have found this film satisfactory as a sensitizing photographic coating.

Having thus fully described our invention, what we claim is:

1. In a printing plate used in photoengraving, an adherent and tenacious sensitizing film, proof against electrolytic action, said film consisting of a mixture of dragon's blood, shellac and a chromate of an alkaline metal.

2. A zinc plate having a sensitized film thereon consisting of dragon's blood, shellac and a chromate of an alkaline metal.

3. A sensitized photographic film for a zinc plate consisting of dragon's blood, shellac and ammonium chromate.

4. A sensitized photographic film for zinc plates used in photoengraving having a basis of dragon's blood and shellac which will be adherent to said zinc plates and which is resistant to electrolytic action in the etching of said plate.

In testimony whereof we hereunto affix our signatures.

CHARLES E. TEBBS.
JOHN HELFRICH.